United States Patent
Kobasa et al.

(10) Patent No.: US 7,468,175 B2
(45) Date of Patent: Dec. 23, 2008

(54) HIGHLY PHOTOSENSITIVE TITANIUM DIOXIDE AND PROCESS FOR FORMING THE SAME

(75) Inventors: Ihor Mykhaylovych Kobasa, Chernivtsi (UA); Wojciech Jan Strus, Krakow (PL); Mykhaylo Andriyovych Kovbasa, Chortkiv (UA)

(73) Assignee: Worthington Technologies, LLC, Sweetwater, TN (US)

( * ) Notice: Subject to any disclaimer, the term of this patent is extended or adjusted under 35 U.S.C. 154(b) by 0 days.

(21) Appl. No.: 11/686,796

(22) Filed: Mar. 15, 2007

(65) Prior Publication Data

US 2008/0146441 A1    Jun. 19, 2008

Related U.S. Application Data

(60) Provisional application No. 60/874,536, filed on Dec. 13, 2006.

(51) Int. Cl.
*C01G 23/047* (2006.01)

(52) U.S. Cl. .................. 423/611; 423/614; 423/612; 423/613

(58) Field of Classification Search .............. 423/608, 423/609, 610, 611, 612, 613, 614
See application file for complete search history.

(56) References Cited

U.S. PATENT DOCUMENTS

| | | |
|---|---|---|
| 4,187,210 A | 2/1980 | Howard, Jr. |
| 4,789,752 A | 12/1988 | Kotzsch et al. |

(Continued)

FOREIGN PATENT DOCUMENTS

WO    WO 2005054136 A1 * 6/2005

OTHER PUBLICATIONS

Miyao et al. JP 2003-001117 Dewent abstract (with Japanese patent publication). "Photocatalytic particle used for coating material and as treating agent for industrial waste water, comprises porous silica microparticle supporting titanium-oxide microparticle, and has specific particle size", JP 2003-001117 published Jan. 7, 2003.*

(Continued)

*Primary Examiner*—Steven Bos
*Assistant Examiner*—Anthony J Zimmer
(74) *Attorney, Agent, or Firm*—Darby & Darby PC

(57) ABSTRACT

A high photosensitivity titanium oxide composition includes a plurality of nanosize particles including titanium dioxide and titanium suboxide. The particles are substantially non-stoichiometric ($TiO_{2-x}$, wherein $0.1<x<0.3$ at a surface of the particles, and in the bulk of the particles x is less than at the surface), having a magnetic susceptibility value ($\chi$) of at least $0.8 \cdot 10^{-6}$ cm$^3$/g at 300 K and being at least 30% by weight rutile. A related method of forming a high photosensitivity titanium oxide composition includes the steps of providing a titanium chloride compound, such as titanium tetrachloride, an oxygen-containing gas and hydrogen, wherein a concentration of the hydrogen is in a stoichiometric excess ($H_2:O_2$) from 2.02:1 to 2.61:1. The titanium chloride compound is burned in the presence of oxygen from the oxygen-containing gas and hydrogen to form plurality of ultrafine particles comprising titanium dioxide and titanium suboxide. The method can include the steps prior to the burning step of mixing the titanium chloride compound, oxygen and hydrogen and heating the same to 50 to 100° C., such as from 70-100° C.

11 Claims, 2 Drawing Sheets

U.S. PATENT DOCUMENTS

| | | |
|---|---|---|
| 5,024,827 A | 6/1991 | Jones et al. |
| 5,672,330 A | 9/1997 | Hartmann et al. |
| 5,985,020 A | 11/1999 | Andes et al. |
| 6,028,360 A | 2/2000 | Nakamura et al. |
| 6,328,947 B1 | 12/2001 | Monden et al. |
| 6,660,243 B1 | 12/2003 | Proft et al. |
| 6,663,851 B1 | 12/2003 | Deller et al. |
| 6,713,038 B2 | 3/2004 | Zhou et al. |
| 2004/0267063 A1 | 12/2004 | Harth et al. |
| 2006/0191834 A1 | 8/2006 | Fuchs et al. |
| 2006/0251563 A1 | 11/2006 | Gole |

OTHER PUBLICATIONS

Tanaka et al. JP10-251021 English Abstract, "Superfine titanium oxide powder small in chlorine content and its production", Sep. 22, 1998.*

Grzechulska-Damszel et al. "Thermally Modified Titania Photocatalysts for Phenol Removal from Water", International Journal of Photoenergy, (2006), vol. 2006, Article ID 96398, pp. 1-7.

Hegde et al. "Synthesis, structure and photocatalytic activity of nano $TiO_2$ and nano $Ti_{1-x}M_xO_{2-\delta}$ (M=Cu, Fe, Pt, Pd, V, W. Ce, Zr)", Pramana—J. Phys., (2005), vol. 65, No. 4, pp. 641-645.

* cited by examiner

HIGHLY PHOTOSENSITIVE TITANIUM DIOXIDE AND PROCESS FOR FORMING THE SAME

CROSS-REFERENCE TO RELATED APPLICATIONS

This application claims priority to U.S. Provisional Patent Application No. 60/874,536 which was filed on Dec. 13, 2006, which is incorporated by reference in its entirety into the present application.

STATEMENT REGARDING FEDERALLY SPONSORED RESEARCH OR DEVELOPMENT

Not Applicable

BACKGROUND OF THE INVENTION

Titanium dioxide is found in three known crystal forms, rutile, anatase and brookite. Anatase and rutile can be used industrially. There are various known methods of synthesis, compositional variants including admixtures, and thermal processing which can modify define the crystalline form(s) obtained.

Titanium dioxide is the most widely used white pigment for the dye and paint industry, ceramics, paper, rubber, and plastic manufacturing. $TiO_2$ is also used in the ointment and other cosmetics production, especially for UV protection.

Photocatalytic activity is generally the most important feature of $TiO_2$. Photocatalytic reactions do not lead to photocorrosion of the reagents and their composition remains unchanged unlike photochemical reactions, where semiconducting reagents undergo photocorrosion. Photochemical reagents absorb light and promote reactions between various substances in gaseous or liquid phases, or induce electrical current. Many semiconductors (including titanium dioxide) exhibit such kind of photochemical activity. Semiconducting photocatalysis is a complex phenomenon with numerous promising spectro-optical, thermodynamic, kinetic, electrophysical and some other fundamental prospects. For instance, titanium dioxide can be used as a basic material for the highly effective photocatalytic systems for transformation, conservation and utilization of the solar energy and for the hazardous waste neutralization and for other environment preservation solutions. $TiO_2$ products also bring good prospects for the low-tonnage chemistry, for design and production of multi-functional materials (for example, materials containing thin-precipitated layer of nano-particles on various substrates), for production of the optical sensors and materials with non-linear optical properties.

These reasons promote numerous photocatalytic investigations. There has been reported water decomposition, which occurs on the surface of $TiO_2$ and produces ecologically friendly molecular hydrogen which can be used as a fuel. There are many successful investigation projects in the field of photocatalysis, as well as many surveys and general works. However, very low quantum yield of most photocatalytic systems is a serious shortcoming, which limits potential applications.

Simple photocatalytic semiconducting system includes donor (D) and acceptor (A) parts acting on the photocatalyst ($TiO_2$). A closed photocatalytic loop can work only if acceptor accepts the excited electron from the conduction band ($e^-+A \rightarrow A^-$) and the hole would transfer to donor ($h^++D \rightarrow D^+$) after photogeneration of the electron-hole couple ($TiO_2 \xrightarrow{h\nu} e^- + h^+$). Further transformation of the intermediates $A^-$ and $D^+$ can run even without light and photocatalyst. Energetic properties of the photocatalytic system should correspond to each other. The electron-hole reactions can run if they are thermodynamically allowed, e.g. potential of the conductivity band should be more negative than the oxidation potential of D ($E_{CB} < E_A^{red}$ and $E_{VB} > E_D^{ox}$). Efficiency of reactions $e^- + A \rightarrow A^-$ and $h^+ + D \rightarrow D^+$ (and the photocatalytic process itself) should rise as the gaps $\Delta E_{red} = E_A^{red} - E_{CB}$ and $\Delta E_{ox} = E_{VB} - E_D^{ox}$ widen.

The photogenerated electrons and holes can recombine. The recombination process competes with the above mentioned redox scheme and significantly lowers efficiency of any semiconducting photocatalyst (including $TiO_2$). Therefore, photocatalytic systems are preferably modified (e.g. by insertion of the electrons and holes carriers, deposition of metals or metal oxides on semiconductors, using double-semiconductor heterostructures) to reduce recombination.

Titanium dioxide can be obtained either in the crystalline or hydrated form through various methods and from various source compounds. Hydrolysis of the aqueous solutions of Ti(IV), hydrolysis of vapor or aerosol, thermodecomposition of alcoholates or coordination compounds of Ti(IV), and high temperature hydrolysis of $TiCl_4$ are the most widely used methods of $TiO_2$ production. There are many industrial methods of $TiO_2$ production.

$TiO_2$ can be used as a light-sensitive component for photo-layers and dielectric materials or as a photocatalyst for some redox reactions. Such compounds generally provide high photocatalytic activity and dispersibility.

Most industrial samples of $TiO_2$ consist of coarsely dispersed particles with low photocatalytic activity. There are some methods of production of fine disperse $TiO_2$ with high photosensitivity. However, such methods are generally inconvenient and laborious.

There is a method of production of superfine titanium dioxide disclosed in U.K. Patent 1052896 which discloses burning of titanium tetrachloride (preliminary heated up to 350° C.) in the gas mixture, which contains oxygen (or carbon dioxide) and hydrogen at 1200-1400° C. Oxygen content in the gas mixture is disclosed to be slightly stoichiometrically excessive relative to the hydrogen content in the gas mixture. In this way, the rutile type of fine titanium dioxide is obtained. However, the photosensitivity of the resulting product is very low and its specific photocatalytic activity (determined through the reaction of the methylene blue reduction) is only about $2.5\text{-}3.0 \times 10^{-5}$ mg/ml·min·m² at room temperature.

BRIEF SUMMARY OF THE INVENTION

A high photosensitivity titanium oxide composition comprises a plurality of nanosize particles comprising titanium dioxide and titanium suboxide. The particles are substantially non-stoichiometric having a magnetic susceptibility value ($\chi$) of at least $0.8 \cdot 10^{-6}$ cm³/g at 300 K and being at least 30% by weight rutile. As used herein, "substantially non-stoichiometric $TiO_2$" comprises $TiO_{2-x}$, wherein $0.1 < x < 0.3$ at a surface of the particles, and in the bulk of the particles x is less than at the surface.

In one embodiment $\chi$ is between $0.8 \times 10^{-6}$ cm³/g and $2.4 \times 10^{-6}$ cm³/g at 300 K. The average size of the particles is generally 10-40 nm, such as 10 to 20 nm. In one embodiment, rutile comprises at least 40% of the composition, with the balance of the composition being essentially all anatase, such as 45 to 55% of rutile and the balance anatase.

The chlorine concentration at a surface of the particles is less than a chlorine concentration in a bulk of the particles, generally being at least an order of magnitude less than the chlorine concentration in the bulk of the particles. The x value at the surface of the particles can be from 0.15<x<0.3 and x in the bulk of the particles can be <0.1, such as from 0.08 to 0.1. A photocatalytic activity of the particles can be 1.4-3.0 mg/ml·min·m² as measured in the reaction of methylene blue reduction at room temperature.

A method of forming a high photosensitivity titanium oxide composition comprises the steps of providing a titanium chloride compound, such as titanium trichloride or titanium tetrachloride, and an oxygen-containing gas and hydrogen, wherein a concentration of hydrogen is in a stoichiometric excess ($H_2:O_2$) from 2.02:1 to 2.61:1, such as 2.12:1, 2.22:1, 2.32:1, 2.42:1 or 2.52:1. The titanium chloride compound is burned in the presence of oxygen from the oxygen-containing gas and hydrogen to form plurality of ultrafine particles comprising titanium dioxide and titanium suboxide. The method can include the steps prior to the burning step of mixing the titanium chloride compound, the oxygen and hydrogen, and heating the titanium chloride compound, oxygen and hydrogen to 50 to 100° C., such as from 70-100° C.

The steady state temperature during the burning step is generally from 700 to 1100° C., such as 800° C., 850° C., 900° C., 950° C., 1000° C., or 1050° C. The method can further comprise the step of steaming the particles at 150-220° C. to promote desorption of HCl and $Cl_2$ from the surface of the particles, such as in a temperature range from 170-200° C.

A molar ratio of the titanium tetrachloride compound to $H_2$ is generally in a range from 1:4 to 1:2. A median size of the particles is generally in the range from 10-40 nm (agglomerated), while individual primary particles are generally 2-8 nm in size. The photocatalytic activity of the particles can be from 1.4-3.0 mg/ml·min·m² as measured in the reaction of methylene blue reduction at room temperature (300 K).

DESCRIPTION OF THE DRAWINGS

A fuller understanding of the present invention and the features and benefits thereof will be obtained upon review of the following detailed description together with the accompanying drawings, in which.

DETAILED DESCRIPTION OF THE INVENTION

A method of forming a high photosensitivity titanium oxide composition comprises the steps of providing a titanium chloride compound, such as titanium trichloride or titanium tetrachloride, an oxygen-containing gas (e.g. air) and hydrogen ($H_2$). The concentration of hydrogen is in a stoichiometric excess ($H_2:O_2$) from 2.02:1 to 2.61:1. The titanium chloride compound is burned in the presence of oxygen from the oxygen-containing gas and the hydrogen to form a plurality of ultrafine (nanoscale) particles. The particles comprise titanium dioxide and titanium suboxide, but are referred to herein as "$TiO_2$ particles according to the invention" or "the inventive composition" for simple reference. The resulting $TiO_2$ particles according to the invention provide a magnetic susceptibility value ($\chi$) of at least $0.8 \cdot 10^{-6}$ cm³/g at 300 K and are at least 30% by weight rutile, with the balance being essentially anatase. $\chi$ can be between $0.8 \times 10^{-6}$ cm³/g and $2.4 \times 10^{-6}$ cm³/g at 300 K. The very high paramagnetic susceptibility of the inventive composition is an indicator of its high photocatalytic activity, such as a room temperate photosensitivity of 1.4-3.0 mg/ml·min·m², which is several orders of magnitude greater than the photosensitivity provided by conventional industrial pigment product ($2.5$-$3.0 \cdot 10^{-5}$ mg/ml·min·m² at room temperature).

The oxygen-containing gas, such as air, is preferably preliminary dried and heated, such as to 70-100° C. The burning process generally occurs in a temperature range from at 700-1100° C. The flame hydrolysis temperature (700-1100° C.) generally defines both hydrolysis rate and structure of the final product. The process rate significantly slows down and the hydrolysis generally does not finish at a temperature lower than 700° C., which has been found to lower the photocatalytic activity of the product. On other hand, an optimal ratio between anatase and rutile forms shifts towards the rutile form at the temperature higher than 1100° C., which has been found by the present Inventors to unfavorably influence the specific surface area and photocatalytic activity of the final product. The final product can undergo a steam treatment at 170-200° C.

Reaction conditions govern type of the final product, its photocatalytic activity, and either anatase or rutile, or their mixture, can be obtained by shifting temperature, ratio between source components, or by adding admixtures about 0.001-3.0 mass % selected from W(VI), V(V), Bi(III), Al(III), Zn(II), Zr(IV), Hf(IV) compounds. Reaction conditions are essentially unchanged whether $TiCl_3$ or $TiCl_4$ is utilized as the titanium source compound.

Figure 1:
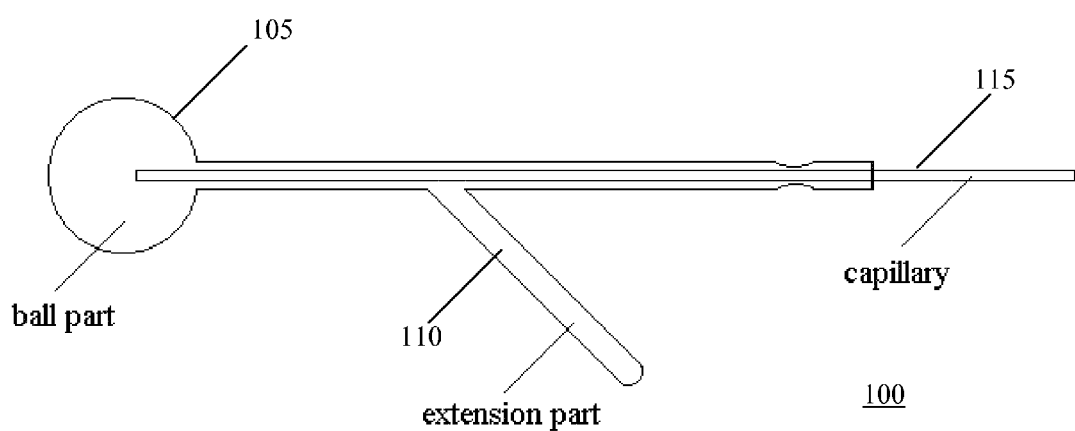
FIG. 1 shows a special ball-extension quartz ampoule that was used by the inventors to measure photocatalytic activity of $TiO_2$ particles according to the invention.

FIG. 1 shows a special ball-extension quartz ampoule 100 that was used by the Inventors to measure photocatalytic activity of $TiO_2$ particles according to the invention. In a typical experiment, 16 mg of $TiO_2$ is loaded in the ball part of the ampoule 105 and 0.6 ml of the methylene blue solution with a concentration of 0.2 g/l together with 0.6 ml of 38% formaldehyde solution are placed in the extension part 110. A capillary 115 is inserted into the ampoule and an oxygen-free inert gas (argon or nitrogen) is pumped the through the capillary 115 until the oxygen content lowers to below $4.0 \cdot 10^{-5}$ vol. %. Then the ampoule 100 is sealed and placed in such a manner to mix $TiO_2$ with the solutions. The mixture is stirred mechanically and irradiated by a lamp (not shown), such as a mercury lamp which provides ultraviolet radiation with a peak typically at 310-400 nm. The distance between the ball part 105 and the lamp is generally about 20 cm. The measured time for the complete discoloring of the reaction mixture is measured. The shorter the time elapsed until discoloring, the higher photocatalytic activity revealed in the $TiO_2$ sample.

As described herein, photocatalytic activity is calculated using the following formula:

$$A_{sp} = \frac{c_0 1000}{\tau_{1/2} Sm},$$

where $c_0$—initial concentration of methylene blue (mg/ml);

$\tau_{1/2}$—time of semi-discoloring, min;

S—specific surface area, m²/g (measured by BET method);

m—mass of $TiO_2$ sample, mg.

This experimental method can also be used for measuring the photocatalytic activity of TiO₂ containing oxide materials and polymer composites.

Figure 2:
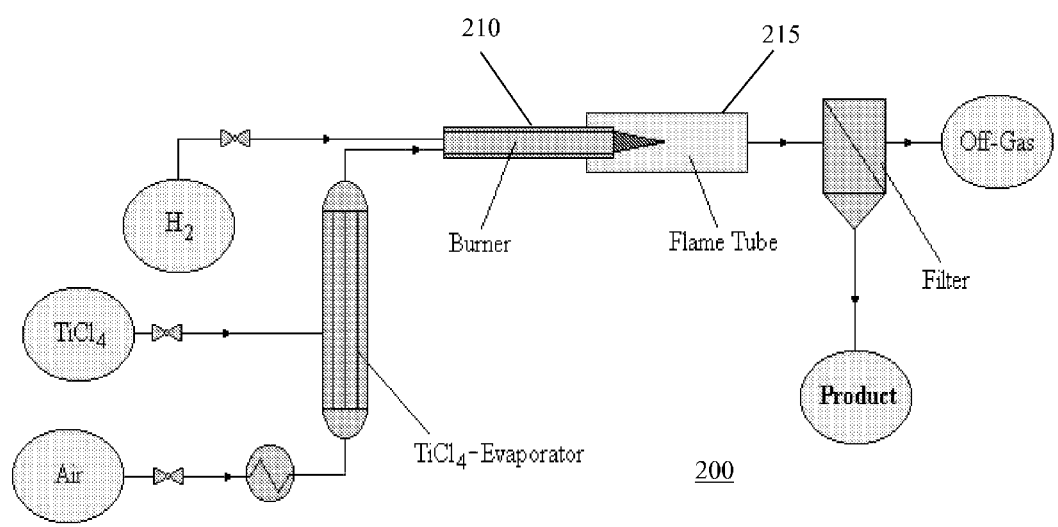
FIG. 2 shows a simplified reactor apparatus that can be used to produce $TiO_2$ particles according to the invention.

FIG. 2 shows a simplified reactor apparatus 200 that can be used to produce TiO₂ particles according to the invention. Source materials include an oxygen comprising gas such as air, hydrogen, and titanium tetrachloride as the titanium chloride compound. The source materials are preferably heated up to 70-100° C. and piped to the burner/combustion chamber 210, where they mix with each other, wherein a stoichiometric excess of H₂ is provided. They are then piped at the laminar mode from the orifice to flame tube 215 where the air-hydrogen mixture burns at 700-1100° C. causing hydrolysis of titanium tetrachloride:

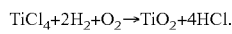

Primary particles of titanium dioxide are formed in this reaction. Primary particles are generally 2 to 8 nm in size.

Another process can also co-run:

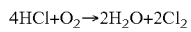

Secondary particles of TiO₂ according to the invention are finally formed as agglomerates in the coagulator. Agglomerated size is generally 10 to 40 nm. This final product can also be steamed at 170-200° C. to remove surface adsorbed HCl and Cl₂.

Superfine pyrogenic TiO₂ according to the invention with a non-stoichiometric composition is the final product of this process. TiO₂ is obtained as a mixture of two various crystalline modifications, anatase and rutile. This causes high defectiveness of the material, which ensures high paramagnetic susceptibility and photosensitivity. X-ray analysis performed by the present Inventors has evidenced that the resulting product is a mixture of separate particles of anatase and separate particles of rutile. However, it is possible that a very small percentage of the particles may include mixed anatase and rutile.

The process should preferably be kept within designated temperature range. The mixture of TiCl₄ (or TiCl₃) and other reactant gases are best kept homogeneous at 70-100° C. This condition ensures homogeneity and fine dispersion (small particle size) of the flame hydrolysis product. TiCl₄ vapor does not reach needful concentration at the temperature lower than 70° C., which causes lower homogeneity of the product. A temperature higher than 100° C. can cause formation of large lumps in the final product.

Heating up to 70-100° C. helps avoid condensation of TiCl₄ vapor during piping. The heating also promotes keeping of the reacting mixture more stable and uniform. The temperature of the reacting mixture is preferably higher than boiling point of the titanium chloride compound, such as for example 140° C. for TiCl₄ (boiling point of ~138° C.). Thus, TiCl₄ should be added to the transportation air in evaporator at the temperature, which prevents condensation of TiCl₄ vapor (for instance, at 70-100° C.). The pipe between evaporator and burner should also be heated to avoid the vapor condensation inside. If the condensation occurs, new liquid-drop phase appears in the gas mixture, which can significantly changes the burning process regime. This change generally leads to obtaining coarse- and poly-disperse TiO₂ powder.

The flame hydrolysis should be kept within 700-1100° C. because the process runs too slow at the temperature lower than 700° C. and reaction of hydrolysis-oxidation does not finish, which significantly lower photosensitivity of the product. On other hand, the ratio between anatase and rutile phases shifts away from optimal value at the temperature higher than 1100° C., which causes lowering of the specific surface area and photosensitivity of the product. The flame hydrolysis temperature can be measured using a thermocouple detector.

The ratio of TiCl₄ (or TiCl₃) and H₂ is preferably within a range from 1:4 to 1:2. Hydrogen excess is unfavorable because it causes extra consumption of hydrogen and does not generally provide any significant improvement of dispersibility and photocatalytic activity of TiO₂. Hydrogen deficit causes worse dispersibility and reduction of photocatalytic activity of TiO₂.

Steam processing at the temperature lower than 150° C. also lowers the product's photosensitivity while processing at the temperature higher than 200° C. does not give any significant rise of photosensitivity but requires extra energy consumption.

Steam processing of TiO₂ powder is a helpful step. Steaming helps eliminate "acid" gases (~0.1-0.15 mass % of HCl, Cl₂), which can get adsorbed on the surface of the TiO₂ particles. TiO₂ and steam are very affine, which makes possible effective elimination (high temperature desorption) of HCl and Cl₂ from the surface of TiO₂. TiO₂ products can be steamed with the air, which was preliminary moistened by the distilled water vapor at 400° C.

Although not preferred, TiO₂ powder product can also be treated with steam in a "boiling bed" apparatus. The "boiling bed" is formed by an inert gas (nitrogen) flux in the heated quartz pipes mounted in the cylinder vertical apparatus. The steam treatment temperature should not be higher than 690-700° C. since higher temperature can lower photocatalytic activity and dispersibility of the product.

Various modifications of TiO₂ (anatase, rutile or their mixture of various ratios between anatase and rutile) can be obtained by shifting the reaction conditions (temperature, ratio between the source compounds, etc.). Physical and chemical properties of these modifications are given in the Table 1 shown below.

TABLE 1

Physico-chemical properties of TiO₂ particles according to the invention

| Property | Unit | Typical Value |
|---|---|---|
| Specific surface area (BET) DIN 66131 | m²/g | 60 ± 15 |
| Particles size TEM | Nm | 10-20 |
| Filling weight DIN ISO 787/1X | g/l | 110-140 |
| pH DIN ISO 787/1X | | 3-4 |
| Weight loss after calcination (2 hours at 1000° C.) | % | <0.8 |
| Whiteness | Units | 94-97 |
| SiO₂ content | % | <0.1 |
| Fe₂O₃ content | % | <0.004 |
| TiO₂ content | % | >99.9 |
| Specific photocatalytic activity (measured in the reaction of reduction of methylene blue) | mg/(ml · min · m²) | 1.4-3.0 |

EXAMPLES

It should be understood that the Examples described below are provided for illustrative purposes only and do not in any way define the scope of the invention.

In the framework of the present invention, TiO₂ can be produced in the continuous process according to the following scheme.

Dry air is being heated up to 70-100° C. and saturated with TiCl$_4$ vapor. This saturation can be realized in the surface evaporator with heated TiCl$_4$. Then the mixture is being mixed with hydrogen and then piped to the burning device. It produces TiO$_2$, which passes through the steam processing.

Example 1

100 Nm$^3$/hr of air was dried and heated to 100° C., then mixed with 100 l/hr of TiCl$_4$ and 40 Nm$^3$/hr of hydrogen and piped to the burning device. The burning took place at 1100° C. and the product was processed with water vapor at 180° C. The photosensitivity of the product obtained was determined through the reaction of the methylene blue reduction. The product consisted of 0.01-0.02 μm particles with a specific surface of 80 m$^2$/g and photocatalytic activity of 3.0 mg/ml·min·m$^2$.

Example 2

100 Nm$^3$/hr of the air was dried and heated to 70° C., then mixed with 100 l/hr of TiCl$_4$ and 40 Nm$^3$/hr of hydrogen and piped to the burning device. The burning took place at 1100° C. and the product was processed with water vapor at 200° C. The resulting TiO$_2$ product had a specific surface area of 80 m$^2$/g and photocatalytic activity of 2.9 mg/ml·min·m$^2$.

Example 3

100 Nm$^3$/hr air was dried and heated to 100° C., then mixed with 50 l/hr of TiCl$_4$ and 40 Nm$^3$/hr of hydrogen and piped to the burning device. The burning took place at 700° C. and the product was then processed with the water vapor at 200° C. The resulting TiO$_2$ product had specific surface of 50 m$^2$/g and photocatalytic activity of 2.0 mg/ml·min·m$^2$.

Example 4

TiO$_2$ obtained as in example 3, was processed with the water vapor at 150° C. The resulting TiO$_2$ had specific surface area of 50 m$^2$/g and photocatalytic activity of 0.9 mg/ml·min·m$^2$.

Based on the experimental data presented, TiO$_2$ particles according to the invention can be seen to provide significantly higher photocatalytic activity as compared to available or otherwise known TiO$_2$ compositions. Higher photosensitivity allows improved performance in a variety of applications, including, but not limited to, as a photocatalyst for various redox processes, for manufacturing of photo materials, in the framework of additive technology of the printed boards production and in a variety of other applications.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The invention claimed is:

1. A method of forming a high photosensitivity titanium oxide composition, comprising the steps of:
   providing a titanium chloride comprising compound, an oxygen (O$_2$)-containing gas and hydrogen (H$_2$), wherein a molar ratio of said hydrogen with respect to oxygen from said oxygen-containing gas (H$_2$:O$_2$) is from 2.02:1 to 2.61:1, and
   burning said titanium chloride comprising compound in the presence of said (O$_2$) and said hydrogen (H$_2$) to result in a chemical reaction to form a plurality of ultrafine titanium dioxide and titanium suboxide particles, wherein essentially all of said hydrogen (H$_2$) that reacts during said method participates in said chemical reaction.

2. The method of claim 1, wherein said oxygen (O$_2$)-containing gas is preliminarily dried, further comprising the steps prior to said burning step of mixing said titanium chloride comprising compound, said oxygen (O$_2$) and said hydrogen (H$_2$) and heating said titanium chloride comprising compound, said oxygen (O$_2$) and said hydrogen (H$_2$) to a temperature from 50 to 100° C.

3. The method of claim 2, wherein said temperature for said heating step is from 70-100° C.

4. The method of claim 1, wherein a steady state temperature during said burning step is from 700 to 1100° C.

5. The method of claim 1, further comprising the step of steaming said particles at 150-220° C. to promote desorption of HCl and Cl$_2$ from the surface of said particles.

6. The method of claim 5, wherein a temperature of said steaming is from 170-200° C.

7. The method of claim 1, wherein a molar ratio of said titanium chloride comprising compound to said hydrogen (H$_2$) is in a range from 1:4 to 1:2.

8. The method of claim 1 wherein said titanium chloride comprising compound comprises titanium tetrachloride.

9. The method of claim 1, wherein a photocatalytic activity of said particles is 1.4-3.0 mg/ml·min·m$^2$ as measured in a reaction of methylene blue reduction at room temperature.

10. The method of claim 1, wherein said composition comprises a mixture of separated particles consisting essentially of said titanium dioxide and titanium suboxide particles.

11. The method of claim 10, wherein said composition includes <0.1 wt % silica.

* * * * *